United States Patent
Blackden et al.

(10) Patent No.: US 7,670,969 B2
(45) Date of Patent: Mar. 2, 2010

(54) FABRICATING SYMMETRIC AND ASYMMETRIC SHAPES WITH OFF-AXIS REINFORCEMENT FROM SYMMETRIC PREFORMS

(75) Inventors: Donald Blackden, New Durham, NH (US); Kenneth Ouellette, Kennebunk, ME (US); Michael Commander, Shaldon (GB); Jonathan Goering, York, ME (US)

(73) Assignee: Albany Engineered Composites, Inc., Rochester, NH (US)

( * ) Notice: Subject to any disclaimer, the term of this patent is extended or adjusted under 35 U.S.C. 154(b) by 293 days.

(21) Appl. No.: 10/993,381

(22) Filed: Nov. 19, 2004

(65) Prior Publication Data

US 2009/0325443 A1 Dec. 31, 2009

(51) Int. Cl.
*B32B 5/26* (2006.01)
*B32B 5/28* (2006.01)

(52) U.S. Cl. .............. 442/239; 442/181; 442/203; 442/218; 156/148; 156/149; 156/196; 264/241; 264/257; 264/258; 264/259; 264/261; 264/263

(58) Field of Classification Search ............ 442/181, 442/203, 218, 239; 156/148, 149, 196; 264/241, 264/257, 258, 259, 261, 263, 340
See application file for complete search history.

(56) References Cited

U.S. PATENT DOCUMENTS

| | | | |
|---|---|---|---|
| 2,998,030 A | 8/1961 | Koppelman et al. | |
| 4,147,822 A | 4/1979 | Kallmeyer et al. | |
| 4,614,279 A * | 9/1986 | Toth et al. | 220/590 |
| 4,922,968 A | 5/1990 | Bottger et al. | 139/384 R |
| 5,556,495 A | 9/1996 | Ford et al. | |
| 5,800,514 A | 9/1998 | Nunez et al. | |
| 6,000,442 A | 12/1999 | Busgen | |
| 6,086,968 A | 7/2000 | Horovitz | |
| 2004/0219851 A1 | 11/2004 | Sahlin et al. | |

FOREIGN PATENT DOCUMENTS

FR 2 365 424 A 4/1978

* cited by examiner

*Primary Examiner*—Andrew T Piziali
(74) *Attorney, Agent, or Firm*—Frommer Lawrence & Haug LLP; Ronald R. Santucci

(57) ABSTRACT

A device for obtaining off-axis reinforcement of a woven object. The device is made up of a fixed mandrel and a rotating mandrel. The rotating mandrel is connected to the fixed mandrel by a shaft that rotates through the middle of the fixed mandrel. The shaft allows the rotating mandrel to move up and down in relation to the fixed mandrel. A portion of the woven object can be clamped to the fixed mandrel while a second portion of the woven object can be clamped to the rotating mandrel. When rotated, the rotating mandrel causes the warp fibers in the woven object to twist off the 0° direction while fill or hoop fibers remain substantially parallel to the 90° direction.

23 Claims, 5 Drawing Sheets

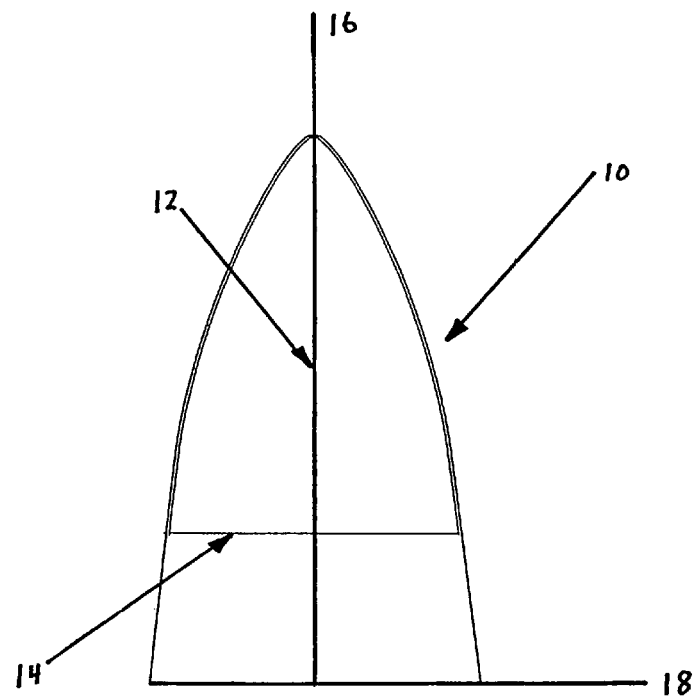
FIG. 1
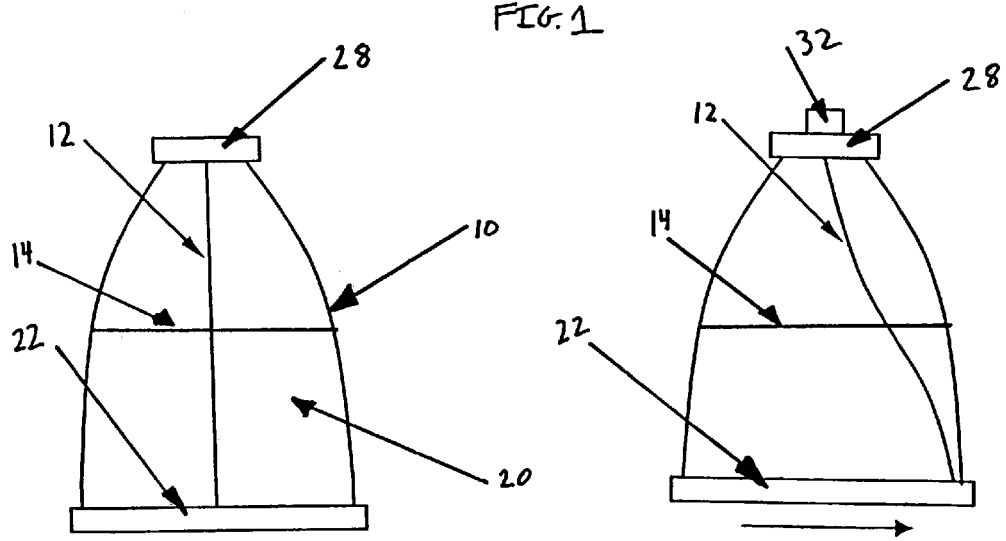
FIG. 2
FIG. 3

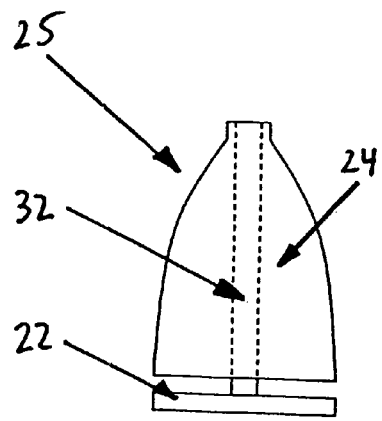
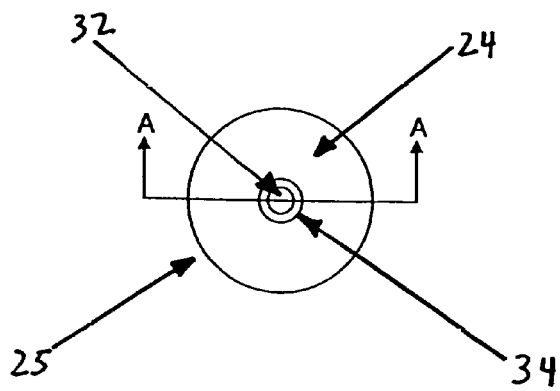
FIG. 4a    FIG. 4b
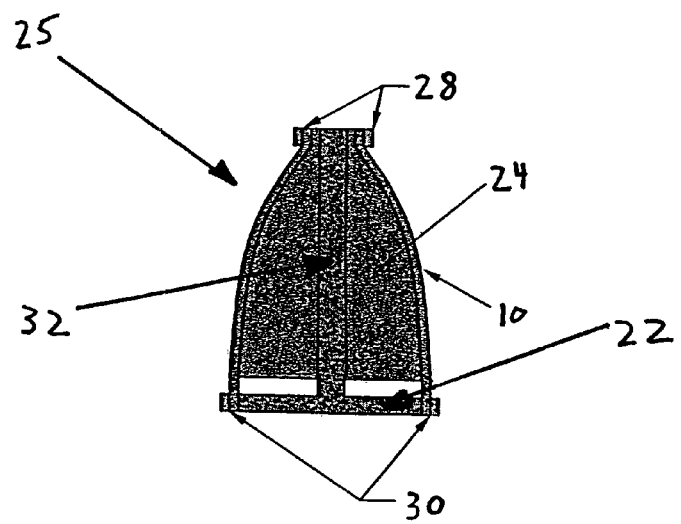
FIG. 5

FABRICATING SYMMETRIC AND ASYMMETRIC SHAPES WITH OFF-AXIS REINFORCEMENT FROM SYMMETRIC PREFORMS

BACKGROUND OF THE INVENTION

1. Field of the Invention

The present invention relates to off-axis reinforced symmetric and asymmetric shapes and methods for forming symmetric and asymmetric shapes with off-axis reinforced seamless woven structures.

2. Background of the Invention

Radomes are housings used in the aerospace industry, which may shelter an antenna, radar, or similar devices from the surrounding environment. For example, a radome may be used to protect an antenna from high winds, icing, and/or temperature extremes in an area surrounding the device. Without protection, these devices become vulnerable to the adverse effects of rain, heat, erosion, pressure, and other sources of damage, depending upon where the device is used.

Radomes for aerospace applications have typically been of axisymmetric or symmetric shapes usually in the form of a cone, hemisphere, paraboloid of revolution, or half ellipsoid of revolution. However, radomes of these shapes, fail to meet the radar cross-section (RCS) requirements imposed by some government agencies. That is, although prior art radomes may adequately shelter the device assembly, because of their geometric shape, they have a high RCS and thus can be easily detected by radar. Unfortunately, radar-absorbing materials may not generally be used in conjunction with radomes because these materials may interfere with the broadcasting and reception of signals by components housed within the radome. For instance, in some aerospace applications, a radome protects the enclosed devices from aerodynamic forces and meteorological damage, while at the same time allowing radar transmission and reception, as well as preventing the devices from upsetting the aerodynamic characteristics of the airborne vehicle upon which it is mounted. Interference with signals transmitted to or from such devices would render the devices useless.

Another design problem facing the aerospace industry regarding radomes is that the materials used to construct a radome must be of sufficiently low dielectric properties so as not to interfere with transmitted signals. Additionally, the dielectric properties of the material must be uniform because non-uniform dielectric properties adversely effect transmissions entering or leaving the radome. For example, radomes are typically composite structures. These composite structures usually consist of glass or quartz fiber preforms with a matrix material that is a polymer having low dielectric properties. Radomes of this type may be constructed using resin transfer molding or by hand laying of glass fiber prepregs. The term "prepreg" is used to describe a fabric or uni-directional tape that is pre-impregnated with a polymeric resin. The construction of preforms from resin transfer molded parts may be done, for example, via cutting and stitching individual plies of glass fiber, shaped weaving, polar weaving and Jacquard weaving (shuttle loom). However, these techniques are time consuming and have a significant drawback in that the radome produced by such methods will result in at least one seam which is often the source of failure of such structures when subject to extreme conditions. Seams are also undesirable in radomes because the dielectric characteristics become non-uniform in the area of the seam and therefore can adversely effect signal transmission and reception.

Three-dimensional Jacquard weaving techniques may, however, be used in the construction of radomes. With these techniques, it is possible to construct a sock-like preform from one piece of cloth. This type of sock-like preform is advantageous since it is seamless, thus eliminating the significant problems associated with seams. In the basic weaving configuration, the warp and fill fibers are at right angles to one another so the continuous filling fiber is oriented in the hoop (90°) direction and the warp fibers follow axial contours (the 0° direction) on the final structure. Accordingly, a three-dimensional Jacquard woven, seamless sock preform is preferred over other techniques.

By selectively including or excluding part of the warp fiber, these socks may form various geometric shapes with or without closed ends. They may be woven as a single layer of fabric, however, multiple socks may be formed over one another to build up the desired thickness. The preform may then be processed into a composite structure using the previously discussed manufacturing techniques. However, weaving complex three-dimensional shapes, such as asymmetrical shapes, with current weaving techniques is a challenge.

In an effort to improve the stealth characteristics of aerospace vehicles, it has been shown that asymmetrically-shaped radomes are preferred since they improve the radar avoidance capabilities of the vehicle. However, the advent of asymmetrically-shaped radomes presents further challenges in the construction of such complex three-dimensionally shaped structures. A proposed solution is the use of automated tape laying techniques, whereby strips of glass (or quartz) prepregs are laid down onto a male mandrel. The tape laying head must have many degrees of freedom, apply consistent pressure and be capable of placing tapes accurately side by side. While such machines are available, they are extremely expensive.

In addition, radomes may need to be reinforced in the off-axis direction. For example, there are radome applications that require torsional strength or stiffness, preferably near the ±45° direction. Moreover, other applications that require bearing strength also utilize reinforcement in the ±45° directions along with reinforcement in the 0° and 90° directions. Off-axis reinforcement cannot be achieved with current basic weaving techniques because with current techniques, the warp and fill fibers are at right angles to one another so the continuous filling fiber is oriented in the hoop (90°) direction and the warp fibers follow axial contours (the 0° direction) on the final structure. Therefore, reinforcement along the ±45° directions is not achieved.

There are two conventional approaches for adding off-axis reinforcement. One approach is to cut two-dimensional cloth on a bias. These off-axis plies require significant handwork, and introduce seams that do not preserve the tube-like integrity of the 0°/90° sock and, as previously stated, adversely effect the structural integrity and dielectric properties of the radome. However, these off-axis plies may be used for very large preforms. The second approach is to use a braided sock. This approach preserves the tube-like nature of the preform, but there is a limit to the size of the preform. Further, this approach does not provide true hoop (90°) reinforcement.

Therefore, a need exists for a cost effective method for forming symmetrically and asymmetrically-shaped objects with off-axis reinforcement.

SUMMARY OF THE INVENTION

In accordance with the present invention, a device is provided for imparting off-axis reinforcement on a woven object. The device comprises a fixed mandrel and a rotating mandrel. The rotating mandrel rotates in relation to the fixed mandrel.

A portion of the woven object can be clamped to the fixed mandrel while a second portion of the woven object can be clamped to the rotating mandrel. When rotated, the rotating mandrel causes the warp fibers in the woven object to twist off the 0° direction to a desired degree while the fill or hoop fibers remain substantially parallel to the 90° direction.

Another aspect of the present invention is a method for forming a woven object with off-axis reinforcement. The method includes interweaving a preform with warp fibers aligned substantially parallel with the 0° direction and fill or hoop fibers aligned substantially parallel with the 90° (hoop) direction. Once completed, the preform is twisted by restraining a first portion of the preform in relation to a second portion the preform. This twisting allows the warp fibers to twist off the 0° direction while the fill or hoop fibers remain substantially parallel to the 90° direction.

A further aspect of the present invention is forming a symmetric woven object with a plurality of warp and fill fibers, which is then formed into an asymmetric shaped object.

Other features and advantages according to the present invention will become apparent from the following detailed description of the illustrated embodiments when read in conjunction with the accompanying drawings in which corresponding components are identified by the same reference numerals.

BRIEF DESCRIPTION OF THE DRAWINGS

For a more complete understanding of the invention, reference is made to the following description and accompanying drawings, in which:

FIG. 1 is a plan view of a symmetric preform;

FIG. 2 is a plan view of the symmetric preform placed on a rotating fixture before twisting according to one aspect of the present invention;

FIG. 3 is a plan view of the symmetric preform of FIG. 2 after twisting;

FIG. 4a is a plan view of the rotating fixture of FIG. 2;

FIG. 4b is a top view of the rotating fixture of FIG. 4a.

FIG. 5 is a cross-sectional view of the rotating fixture of FIG. 4b about line A-A;

DETAILED DESCRIPTION OF THE PREFERRED EMBODIMENTS

Figure 6A:
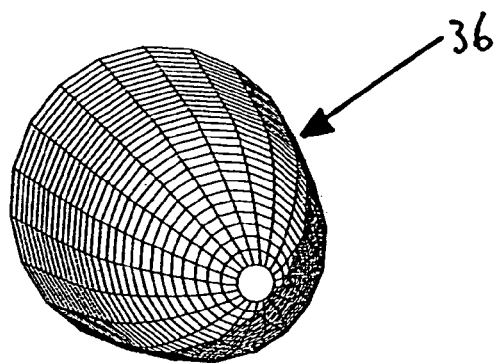
FIG. 6a is a symmetrically-shaped preform according to one aspect of the present invention.

According to one aspect of the present invention, as depicted in FIG. 1, a symmetrically-shaped sock-like preform 10, which may be open or closed ended, includes warp fibers 12 substantially parallel to the 0° direction 16 and fill or hoop fibers 14 substantially parallel to the 90° or hoop direction 18. As used, the hoop or fill fibers and the 90° direction refer to the fibers and direction that run circumferentially around the preform, while the warp fibers and 0° direction run perpendicularly to the hoop fibers of the preform. The symmetrically-shaped preform 10 may be woven using conventional three-dimensional Jacquard weaving. The warp and fill fibers may be of any of the fiber types used to weave preforms. Further, the fibers may be pre-impregnated with a polymeric resin.

Referring to FIG. 2, a symmetrically-shaped preform 10 is placed upon a fixed mandrel 20 with the warp fibers 12 oriented substantially perpendicular to a rotating mandrel 22 and the fill or hoop fibers 14 oriented substantially parallel to a rotating mandrel 22. FIG. 4a shows the specially designed fixture 25 used to achieve off-axis reinforcement. A cross section through the fixture 25 about the line A-A in FIG. 4b is shown in FIG. 5. The fixture 25 has two main parts, a fixed mandrel 24 and a rotating mandrel 22. The symmetrically-shaped preform 10 is clamped at the upper portion 28 of the fixed mandrel 24 and at the lower portion 30 of the rotating mandrel 22.

In order to improve the structural rigidity and strength of the preform, it is desirable to shear or twist the warp fibers 12 to achieve off-axis reinforcement.

The required shear and shape is achieved by twisting the symmetrically-shaped preform 10 on a rotating fixture 25 whose shape is that of the required final object. In FIG. 3, after the rotating mandrel 22 is rotated, the warp fibers 12 twist off the 0° direction 16 and are no longer substantially perpendicular to the base of the rotating mandrel 22. However, the fill or hoop fibers 14 remain substantially parallel to the base of the rotating mandrel 22 or 90° direction 18. The basic concept is to shear the 0°/90° sock so that the axial reinforcement, the 0° or warp fibers 12, twist into the desired off-axis angle while the fill or hoop fibers 14 remain substantially in the 90° direction.

Upon twisting, as the warp fibers shear off the 0° direction, the length of the preform 10 will shorten. In order to compensate for shortening of the preform 10, the shaft 32 of the rotating mandrel 22 is free to move up or down in a hole 34 through the center of the fixed mandrel 24 as shown in FIG. 4b. The shortening of the symmetrically-shaped preform 10 can be calculated and compensated for during design and construction of the symmetrical preform 10.

In fabrics with tight weaves, off-axis reinforcement can be obtained for angles up to approximately 20° before the preform or sock starts to buckle. In order to achieve greater angles of off-axis reinforcement, say in the range of approximately 45°, a fabric with more open weaves can be used, which will allow further twisting of the sock prior to buckling.

A composite structure that utilizes this type of preform can be formed using a balanced construction technique. That is, for every +θ° ply there is a −θ° ply. This can be accomplished by pairing a sock that has been twisted in a first direction or negative direction, with a sock that has been twisted in a second direction or positive direction. Twisted socks can also be combined with untwisted socks to provide a combined preform that has 0°/90° reinforcement as well as off-axis reinforcement. These sock-like preforms can be combined in any combination or number as is necessary to achieve the required reinforcement, thickness and strength of the final composite object. The result is a seamless preform having increased mechanical properties due to reinforcement in all directions compared with untwisted preforms which have no off-axis reinforcement. The preform can then be processed into a composite structure using known manufacturing techniques such as resin transfer molding.

A three-dimensional Jacquard weaving technique provides a cost effective means of making symmetrically-shaped sock-like preforms. However, other techniques known to those of skill in the art may also be used without departing from the scope of the present invention.

Figure 6B:
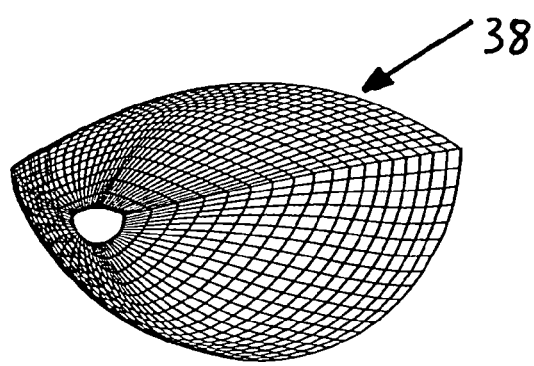
FIG. 6b is an asymmetrically-shaped preform according to another aspect of the present invention.
Figure 7:
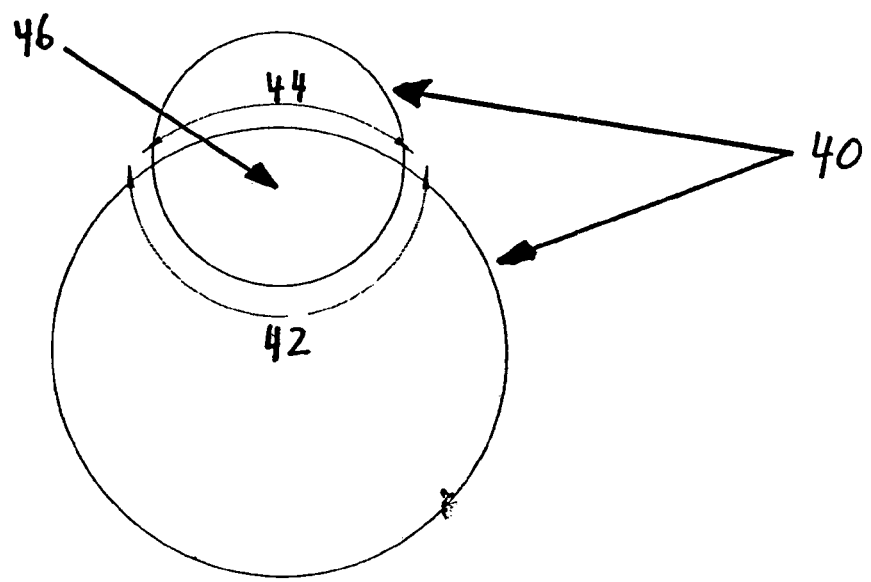
FIG. 7 depicts intersecting circles used to obtain an asymmetric shape as shown in FIG. 6b.
Figure 8:
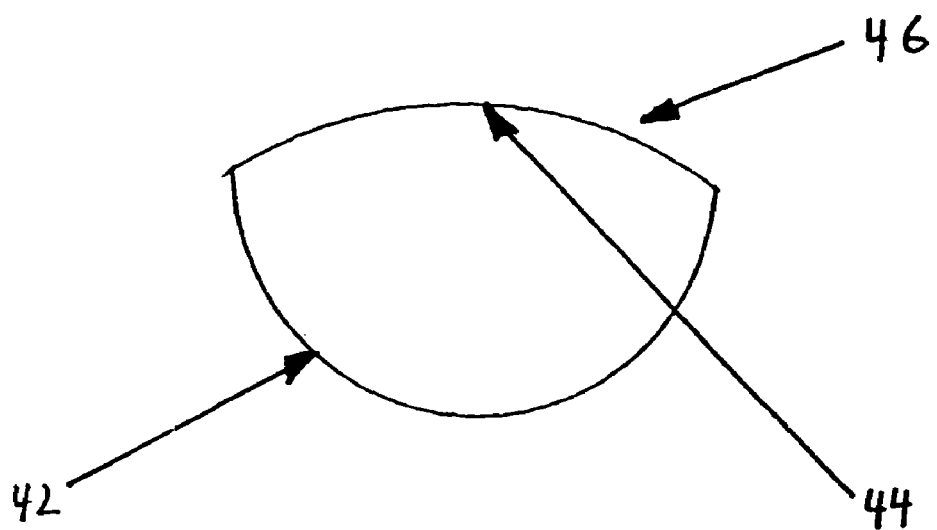
FIG. 8 shows a resulting asymmetric shape formed by the intersecting circles of FIG. 7.
Figure 9:
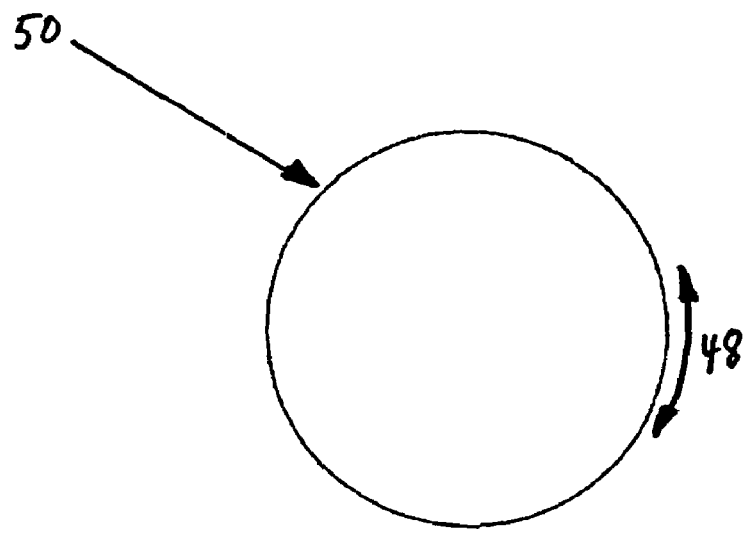
FIG. 9 shows the circumference of the resulting symmetric shape that is used to obtain the asymmetric shape.

FIG. 6a shows a symmetrically-shaped preform 36. FIG. 6b demonstrates that the symmetrically-shaped preform 36 can be transformed into an asymmetrically-shaped preform 38. The symmetrically-shaped preform 36 can be made to fit an asymmetrically-shaped mandrel, provided the hoop or circumferential path length of the symmetrically-shaped sock preform matches the hoop or circumferential path length of the asymmetrically-shaped object at discrete longitudinal locations. By way of example, FIG. 7 demonstrates that an asymmetrically-shaped preform 46, also shown in FIG. 8, is constructed from elements of two intersecting circles 40. FIG. 7 and FIG. 9 demonstrate that the sum of the two intersecting path lengths, 42 and 44 of the intersecting circles 40, equates to the circumference 48 of the circle 50 which is a symmetrical preform.

Figure 10:
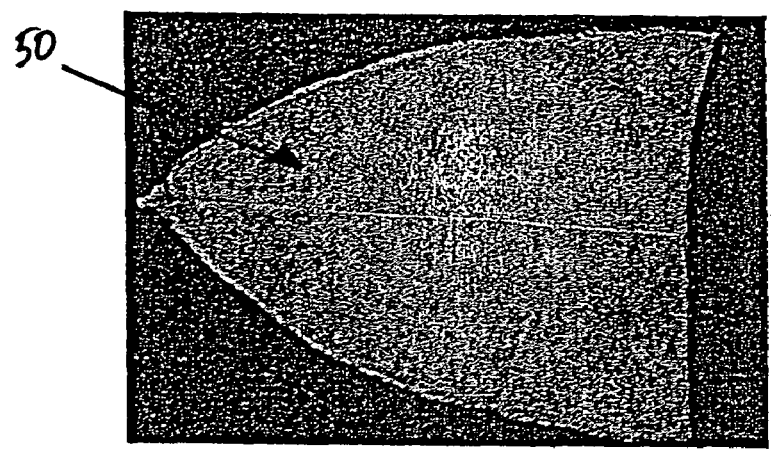
FIG. 10 is a plan view of a symmetrically-shape preform according to one embodiment of the present invention.
Figure 11:
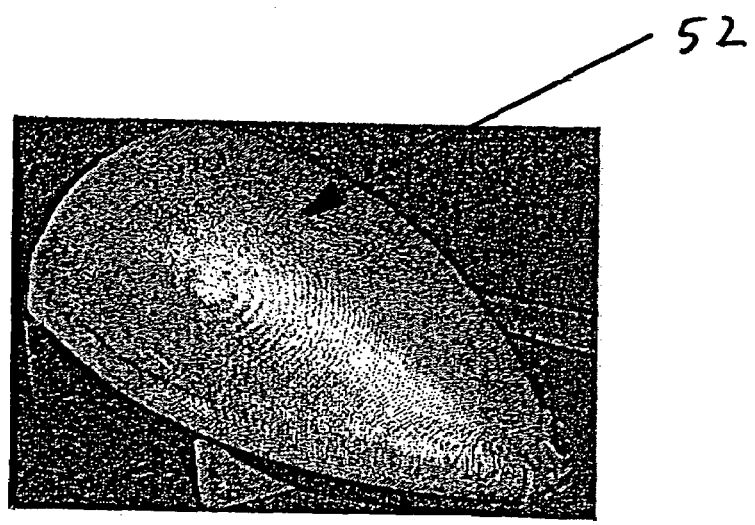
FIG. 11 is a plan view of an asymmetrically-shaped preform according to one embodiment of the present invention.

FIG. 10 shows a symmetrically-shaped preform or sock 50 trimmed to shape that was designed to fit an asymmetrically shaped mandrel. FIG. 11 shows the symmetrically shaped preform or sock 50 after it is placed on an asymmetrical mandrel will adjust to that shape. Such an asymmetrically-preform may then be twisted to impart off-axis reinforcement. The result is an asymmetrically-shaped object with off-axis reinforcement 52. The resulting preform can then be further processed into a composite structure using known manufacturing techniques such as resin transfer molding.

Accordingly, it has been shown that both symmetrically-shaped and asymmetrically-shaped objects with off-axis reinforcement can be constructed from sock-like preforms.

Although a preferred embodiment of the present invention and modifications thereof have been described in detail herein, it is to be understood that this invention is not limited to this precise embodiment and modifications, and that other modifications and variations may be effected by one skilled in the art without departing from the spirit and scope of the invention as defined by the appended claims.

What is claimed is:

1. A method of forming a multilayer woven object with off-axis reinforcement, the method comprising the steps of:
   interweaving a first preform with warp fibers aligned substantially parallel with the 0° direction and fill fibers aligned substantially parallel with the 90° (hoop) direction;
   interweaving one or more additional preforms with warp fibers aligned substantially parallel with the 0° direction and fill fibers aligned substantially parallel with the 90° (hoop) direction;
   twisting said first preform in a first direction by restraining a first portion of said first preform in relation to a second portion of said first preform, wherein said twisting allows the warp fibers to twist off the 0° direction in a negative direction while the fill or hoop fibers remain substantially parallel to the 90° direction;
   twisting said one or more additional preforms in a second direction by restraining a first portion of said one or more additional preforms in relation to a second portion of said one or more additional preforms, wherein said twisting allows the warp fibers to twist off the 0° direction in a positive direction while the fill or hoop fibers remain substantially parallel to the 90° direction; and
   layering said one or more additional preforms with said first preform.

2. The method in claim 1, wherein said multilayer woven object is interwoven using a Jacquard technique.

3. The method in claim 1, wherein said multilayer woven object is seamless.

4. The method in claim 1, wherein said first and one or more additional woven preforms are symmetric.

5. The method in claim 4, wherein said first and one or more additional symmetric preforms are formed into an asymmetric preform.

6. The method of claim 1, further comprising the step of placing one of said first and one or more additional preforms on a rotating fixture.

7. The method of claim 6, wherein the rotating fixture comprises a fixed mandrel and a rotating mandrel.

8. The method of claim 7, further comprising a step of restraining a first portion of said one of said first and one or more additional preforms on the fixed mandrel in relation to a second portion of said preform.

9. The method of claim 8, wherein said twisting step is performed by rotating said rotating mandrel.

10. The method of claim 9, wherein said twisting step causes said warp fibers to twist off the 0° direction to an angle related to the degree of rotation of said rotating mandrel.

11. The method of claim 9, wherein said hoop or fill fibers remain substantially parallel to the 90° direction after said twisting step.

12. The method of claim 7, wherein said fixed mandrel is symmetrically shaped.

13. The method claim of claim 7, wherein said fixed mandrel is asymmetrically shaped.

14. The method claim of claim 8, wherein said rotation is in the range of up to about 45°.

15. A multi-layered woven object comprising:
   a first layer of a preform having a plurality of warp fibers, twisted off the 0° orientation in a negative direction and a plurality of fill or hoop fibers, aligned substantially parallel with the 90° (hoop) direction, wherein the plurality of warp fibers twisted off the 0° direction provide for off-axis reinforcement of the woven object; and
   a further layer of one or more preforms having a plurality of warp fibers twisted off the 0° orientation in a positive direction and a plurality of fill or hoop fibers, aligned substantially parallel with the 90° (hoop) direction.

16. The multilayered woven object in claim 15, formed using a Jacquard technique.

17. The multilayered woven object in claim 15, wherein said object is seamless.

18. The woven object in claim 15, wherein said object is symmetric.

19. The woven object in claim 15, wherein said object is asymmetric.

20. The woven object in claim 15, wherein said object is a preform for a radome.

21. The woven object in claim 15, wherein said object is open ended.

22. The woven object in claim 15, wherein said object is closed ended.

23. The woven object of claim 15, wherein the fibers are impregnated with a polymeric resin.

* * * * *